(12) United States Patent
Binkert et al.

(10) Patent No.: US 8,774,625 B2
(45) Date of Patent: Jul. 8, 2014

(54) METHOD AND SYSTEMS FOR IMPLEMENTING HIGH-RADIX SWITCH TOPOLOGIES ON RELATIVELY LOWER-RADIX SWITCH PHYSICAL NETWORKS

(75) Inventors: Nathan L. Binkert, Redwood City, CA (US); Alan L. Davis, Coalville, CA (US); Moray McLaren, Bristol (GB)

(73) Assignee: Hewlett-Packard Development Company, L. P., Houston, TX (US)

( * ) Notice: Subject to any disclaimer, the term of this patent is extended or adjusted under 35 U.S.C. 154(b) by 338 days.

(21) Appl. No.: 13/058,024

(22) PCT Filed: Aug. 8, 2008

(86) PCT No.: PCT/US2008/009524
§ 371 (c)(1),
(2), (4) Date: Apr. 11, 2011

(87) PCT Pub. No.: WO2010/016819
PCT Pub. Date: Feb. 11, 2010

(65) Prior Publication Data
US 2011/0176804 A1    Jul. 21, 2011

(51) Int. Cl.
*H04J 14/00* (2006.01)
(52) U.S. Cl.
USPC .......... 398/45; 398/46; 398/47; 398/48; 398/49; 398/51; 398/54; 385/24; 385/16; 385/17; 385/18; 370/216; 370/254; 370/255; 370/228; 370/225
(58) Field of Classification Search
USPC .......... 398/45, 46, 47, 48, 49, 50, 51, 52, 53, 398/54, 55, 56, 57, 79, 83, 58, 59; 385/24, 385/16, 17, 18; 370/254, 255, 392, 351, 370/355, 228, 225, 216
See application file for complete search history.

(56) References Cited

U.S. PATENT DOCUMENTS

| | | | |
|---|---|---|---|
| 5,457,556 A | * | 10/1995 | Shiragaki ................. 398/50 |
| 5,541,914 A | | 7/1996 | Krishnomoorthy et al. |
| 6,230,252 B1 | | 5/2001 | Passint et al. |

(Continued)

FOREIGN PATENT DOCUMENTS

| | | |
|---|---|---|
| CN | 1859382 A | 11/2006 |
| CN | 1993915 A | 7/2007 |
| WO | 9913606 | 3/1999 |
| WO | 02089401 | 11/2002 |

OTHER PUBLICATIONS

International Search Report, PCT/US2008/009524, Apr. 14, 2009, 11 pages.

(Continued)

*Primary Examiner* — Hanh Phan

(57) ABSTRACT

Embodiments of the present invention are directed to implementing high-radix switch topologies on relatively lower-radix physical networks. In one embodiment, the method comprises constructing the physical network (702) composed of one or more optical switches connected via one or more waveguides. A desired switch topology (704) is then designed for implementation on the physical network. The switch topology is then overlain on the switch network by configuring the optical switches and waveguides (706) to implement the switch topology on the physical network. The optical switches can be reconfigured following a transmission over the physical network and can be configured to implement circuit switching or packet switch.

18 Claims, 18 Drawing Sheets

(56) References Cited

U.S. PATENT DOCUMENTS

| | | | |
|---|---|---|---|
| 6,512,612 B1* | 1/2003 | Fatehi et al. | 398/49 |
| 6,741,552 B1 | 5/2004 | McCrosky et al. | |
| 6,873,796 B1* | 3/2005 | Nakahira | 398/51 |
| 7,088,919 B2* | 8/2006 | Graves | 398/50 |
| 7,440,448 B1 | 10/2008 | Lu et al. | |
| 2002/0145778 A1 | 10/2002 | Strasser et al. | |
| 2008/0212157 A1* | 9/2008 | Ishii et al. | 359/223 |

OTHER PUBLICATIONS

Goke et al., Banyan Networks for Partitioning Multiprocessor Systems, In the Proceedings of the International Symposium on Computer Architecture (ISCA), ACM, New York, 1973 (8 pages).

Kim et al., "Flattened Butterfly Topology for On-chip Networks" In the proceedings of the 40th Annual IEEE/ACM International Symposium on Micro-architecture (MICRO), Chicago, IL. Dec. 2007 (11 pages).

Chong et al., "Fault Tolerance and Performance of Multipath Multistage Interconnection Networks" In the proceedings of Advanced Research in VLSI and Parallel Systems, MIT press, Mar. 1992 (16 pages).

European Patent Office, EP Application No. EP 08795141, Extended European Search Report, May 29, 2012 (6 pages).

Korean Intellectual Property Office, International Search Report and Written Opinion for PCT/US2008/009524 dated Apr. 14, 2009 (11 pages).

The International Bureau of WIPO, Preliminary Examination Report for PCT/US2008/009524 dated Feb. 17, 2011 (6 pages).

\* cited by examiner

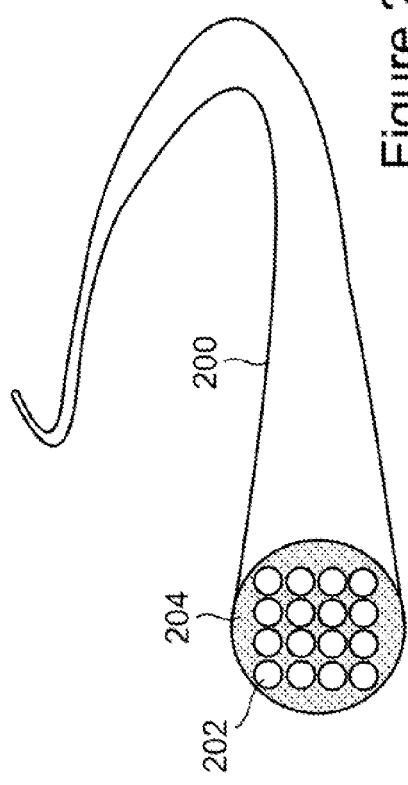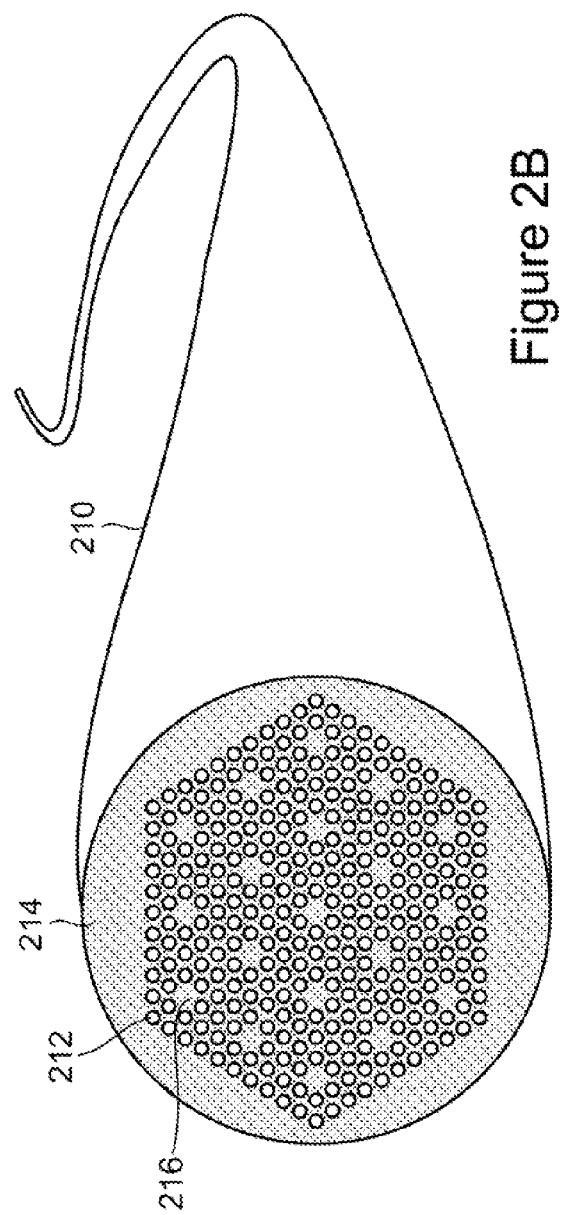

METHOD AND SYSTEMS FOR IMPLEMENTING HIGH-RADIX SWITCH TOPOLOGIES ON RELATIVELY LOWER-RADIX SWITCH PHYSICAL NETWORKS

CROSS-REFERENCE TO RELATED APPLICATION

This application is a national stage application under 35 U.S.C. §371 of PCT/US2008/009524, filed Aug. 8, 2008.

TECHNICAL FIELD

Embodiments of the present invention relate to optical devices, and, in particular, to constructing optical-based, high-radix switch topologies that are based on low-radix switch physical networks.

BACKGROUND

In order for massively parallel systems to achieve their full performance potential, the processing power, memory capacity, and communication resources should be balanced. Communication performance can be measured by considering bisection bandwidth and average communication latency. Bisection bandwidth refers to the bandwidth between two substantially equal parts of a network. Average communication latency refers to the average time delay between the moment information is sent to the moment it is received. Latency can be measured as the sum of fall-through delay and payload transport time. The payload transport time is the number of bytes being transported divided by the aggregate bandwidth of the physical link which may consist of one or more wires in the case of electrical communication or waveguides in the case of optical communication. Fall-through delay is the time it takes 1 bit on any path to transit from a source to a destination for a particular source to destination route and can be determined as the sum of the time on the wire or waveguide plus any propagation delay through any intervening logic, plus any control delay incurred in the routing mechanism.

Two fundamentally different switching networks are possible: packet switched and circuit switched. Circuit switched networks consist of a set of circuit switches connected by communication links. A link may be a wire, an optical fiber, or any other suitable device for transmitting information in electrical or optical signals. The circuit switches can be configured to directly connect input links to output links to create a desired path from a sender to the desired receiver. Circuit switched networks must be configured prior to a communication event. Circuit switched networks therefore have a physical path topology which changes based on the configuration of the network. Packet switched networks have a fixed physical topology consisting of a set of routers which are interconnected with links. When routing a packet from a source to a destination in a packet switched network, a routing decision must be made at each router. When a packet arrives at a router, the router examines the destination address portion of the packet header. The router then places the packet on an appropriate link that leads to the next router on a path to the destination or on the link that actually reaches the destination.

High-radix switch networks reduce all fall-through delay components by reducing the average number of hops which a message must pass through, but suffer from a cost perspective due to the increased wiring complexity. In the subsequent description, the term "switch" will refer to either a circuit switch in circuit switched networks or a router in packet switched networks. For switches with an equal number of input and output links the term "radix" refers to the number of input or output links associated with each switch. Each link comprises 1 or more wires or waveguides. Each wire is capable of carrying 1 bit of information per clock cycle. A number of different wavelengths can be wave division multiplexed on a single waveguide. Thus, a waveguide capable of carrying n wavelengths is capable of carrying n bits of information per clock cycle. The term "link width" refers to the number of bits that can be transported on a link per clock cycle. The term "hop" refers to the number of paths traversed from a source to a destination. If a message or packet traverses m hops then m−1 switches will be involved in making routing decisions. Circuit switched networks reduce latency by removing the need to make a routing decision at each hop but incur configuration delays which are problematic if reconfiguration is done often.

The cost of a communication network is based on the number of switches, routers, repeaters, and the associated system level integration and fabrication effort, all of which are heavily influenced by wiring complexity. Wiring complexity refers to the number of links that must be connected to form the network. Due to pin bandwidth limitations, most high performance communication fabrics are built from high-radix topologies which employ many low bandwidth connections rather than fewer high bandwidth connections. The use of electrical high bandwidth connections is problematic in terms of excess power consumption and the difficulty in insuring that sufficient signal integrity is present to provide reliable communication.

Computer systems with very large numbers of nodes combined with high-radix switch networks present a significant wiring challenge at installation time and significant cost in terms of physical connectors and cables. Networks with a large number of nodes can also be problematic when adding resources to the network due to the need to reconfigure large numbers of cables and wires.

In recent years, a number of high-radix switch topologies have been proposed for implementation of massively parallel computing systems. For example, fat-trees are a high-radix switch topology that were used in Connection Machines, such as the CM-5, and are currently used in the Black Widow switch of systems produced by Cray, Inc. Numerous other contributions have been made which use high-radix switch topologies on physical switch networks, such as the flattened Butterfly by John Kim, James Balfour, William Daily "Flattened Butterfly Topology for On-chip Networks" *In the proceedings of the* 40*th Annual IEEE/ACM International Symposium on Micro-architecture (MICRO)*, Chicago, Ill. December 2007, and dilated path multistage switches by Frederic Chong, Erin Egozy, and Andre DeHon "Fault Tolerance and Performance of Multipath Multistage Interconnection Networks" *In the proceedings of Advanced Research in VLSI and Parallel Systems*, MIT press, March 1992, and multistage Banyan networks by L. Rodney Goke and G. J. Lipovski "Banyan networks for partitioning multiprocessor systems" *In the Proceedings of the International Symposium on Computer Architecture (ISCA)*, ACM, New York, 1973.

Accordingly, systems and methods for economically implementing high-radix switch topologies and efficiently utilizing low-radix switch physical networks and hybrid packet and circuit switched control approaches are desired.

SUMMARY

Embodiments of the present invention are directed to implementing high-radix switch topologies on relatively low-radix switch physical networks. In one method embodiment, the method comprises constructing the switch physical network comprising hybrid packet/circuit switches connected via links. A desired high-radix packet switch topology is then designed for implementation on the relative physical network. The packet switch topology is then overlain on the physical network by configuring the hybrid packet/circuit switches to implement the logical packet switch topology on the physical network. The hybrid packet/circuit switches can be reconfigured following a transmission over the physical network and can be configured to implement alternate packet switching topologies.

In one system embodiment, a hybrid packet/circuit switch includes an optical circuit switch which is optically coupled to one or more input optical links and one or more output optical links, and a packet switching device optically coupled to the optical circuit switch. The packet switching device converts optical signal inputs to the circuit switch on the input optical links into electrical signals that are buffered, analyzed, routed, and converted back into optical signals that are sent to the optical circuit switch which places the signals on the output optical links.

BRIEF DESCRIPTION OF THE DRAWINGS

FIG. 2A shows a cross-sectional view of a 16-core fiber configured in accordance with embodiments of the present invention.

FIG. 2B shows a cross-sectional view of a photonic crystal fiber configured in accordance with embodiments of the present invention.

DETAILED DESCRIPTION

Figure 1:
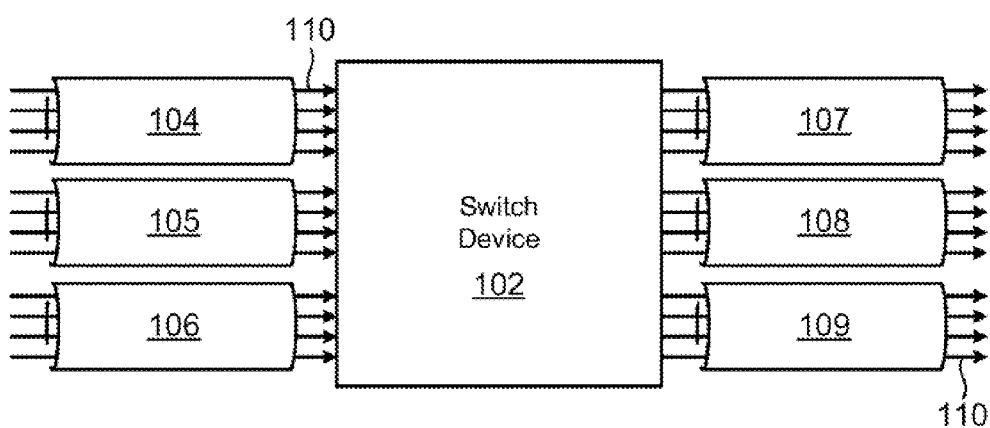
FIG. 1 shows a single switch device configured in accordance with embodiments of the present invention.

Method and system embodiments of the present invention are directed to implementing high-radix communication switch topologies on relatively lower radix physical networks. Embodiments of the present invention can be implemented using optical technology.

Definition of Terms

As used herein, the term "optical signal" refers to electromagnetic radiation of a particular wavelength that has been amplitude modulated. In other words, an optical signal can be composed of high and low amplitude patterns, where, for example, a "high" amplitude represents the bit "1" and a "low" amplitude represents the bit "0."

The term "waveguide" refers to an optical fiber, a core, or any suitable light transmitting medium surrounded by a confinement layer of lower dielectric constant.

The term "link" as used herein refers to one or more waveguides.

The term "switch topology" used herein refers to a configuration or arrangement of switches and interconnecting communications links forming a communication network.

The term "physical" as used herein refers to items having substance or material existence in the real material world, rather than as an idea or notion, and are able to be touched and seen.

The term "radix" as used herein refers to the number of input or output ports of a switch.

The term "switch" as used herein as a general term to refer to circuit switches and hybrid packet/circuit switches, which are described in greater detail below in subsections I and II, respectively.

Advantages

Embodiments of the present invention have a number of advantages over conventional electrical based systems and methods for configuring switch networks. In all optical implementations, the circuit switched mechanism significantly minimizes the energy and component overheads that would be incurred in an electrical-based network. In addition, dense wave division multiplexing ("DWDM") can be used to further increase the cross-section bandwidth. In contrast, DWDM on wires is simply not feasible and the only way to increase the cross-sectional bandwidth of electrical switches is to increase the number of wires in each channel or increase the speed of each wire. Increasing wire speed is fundamentally limited by signal integrity and power problems. Increasing the number of wires also incurs additional cost and is problematic due to electrical component input-output pin limitations.

Many high-radix switch networks, once designed, are static in their instantiation. By contrast, embodiments of the present invention are directed to systems and methods for designing various high-radix switch topologies that can be implemented on a low-radix switch physical network. In other words, the circuit switch topology can be changed to meet the needs of changing traffic patterns or to compensate for link or switch failure. Note this is useful only in the case where the traffic patterns persist long enough to amortize the configuration time. This allows the option of splitting the cross section bandwidth on a per channel granularity between one or more specific circuit switched routes.

Embodiments of the present invention also achieve a low source to destination hop count and the high cross-section bandwidth associated with high-radix switch topologies while achieving the low cost, low link count and simple interconnect complexity of low-radix switch physical networks.

Circuit switches and passive networks are described in subsection I. Hybrid packet/circuit switches are described in subsection II. Methods for implementing high-radix communication switch topologies on relatively lower radix switch networks using circuit switches are described for two exemplary networks in subsection III.

I. Circuit Switches and Passive Networks

Switched networks include numerous instances of switch devices and links. A physical network is configured by interconnecting switch devices with links to implement a particular network topology. FIG. 1 shows a single switch device 102 connected to input optical links 104-106 and output optical links 107-109 in accordance with embodiments of the present invention. As shown in the example of FIG. 1, each of the input optical links 104-106 transmits four input optical signals to the switch device 102, where the input optical signals are represented by directional arrows pointing to the switch device 102. Each of the output optical links 107-109 transmits four optical signals away from the switch device 102, where the output optical signals are represented by directional arrows pointing away from the switch device 102. The optical links can be configured with 4 waveguides or waveguides that each carry 1 optical signal, or using DWDM, each optical link 104-109 can be configured with a single waveguide configured to carry multiple optical signals.

Multi-core fibers ("MCFs") and photonic-crystal fibers ("PCFs") are just two examples of optical links. MCFs and PCFs contain multiple waveguides where each waveguide can transmit one or more optical signals. FIG. 2A shows a cross-sectional view of a 16-core fiber 200 configured in accordance with embodiments of the present invention. The 16-core fiber 200 includes 16 waveguides called "cores," such as core 202, extending the length of the fiber 200. The cores are surrounded by a relatively lower refractive index cladding material 204 that forms a cladding layer around each core. Although the multi-core fiber is shown as having a circular cross section, the cores can be arranged to have a planar configuration to produce multi-core optical fiber ribbons. Embodiments of the present invention are not limited to 16-core fibers. The fibers can be configured with any suitable number of cores, and the cores can be configured to support one or more modes of electromagnetic radiation. FIG. 2B shows a cross-sectional view of a PCF 210 configured in accordance with embodiments of the present invention. The PCF 210 is composed of a hexagonal lattice of holes, such as air hole 212, or another suitable relatively low refractive index material that extends the length of the fiber in a relatively higher refractive index material 214, such as silica. As shown in FIG. 2B, the holes are arranged to form 19 cores, such as core 216, where light is guided. Other PCFs can be configured with fewer or more cores and can be configured with concentric rings of two or more materials that operate as Bragg reflectors to confine light to a central core.

Returning to FIG. 1, the switch device 102 can be used to connect particular input waveguides of the input optical links 104-106 to particular output waveguides of the output optical links 107-109. For example, the switch device 102 can be configured to direct an optical signal 110 input to the switch device 102 on a waveguide of the optical link 104 to a particular waveguide of the optical link 109. FIG. 1 also shows how a high radix switch topology can be constructed from a physically low radix switch topology. In this case, the radix of this switch device 102 is 3 since there are 3 input optical links 104-106 and 3 output optical links 107-109.

The switch device 102 can be either a circuit switch or a passive network. A circuit switch needs to be configured to achieve a desired connectivity between links. A passive network consists of wires or optical waveguides and contains no switches that can be configured. A passive network therefore implements an interconnect topology that is static. The advantage of a circuit switch is that it can be reconfigured as needed to more efficiently handle changing demands of a network or to maintain connectivity in networks where either a link or switch device or both have failed. Other advantages of the circuit switch include that there is no routing delay contribution to the fall through delay which helps with both latency and power. A disadvantage of circuit switches is that while the switches are being configured no communication traffic can be carried out. Hence the cost associated with the flexibility benefits of a circuit switch is due to reduced network availability during the reconfiguration time. If reconfiguration is frequent then a significant increase in average packet latency will be observed, whereas if reconfiguration is rare the average packet latency will be reduced since the reconfigured network advantage will outweigh the availability loss due to reconfiguration.

Figure 3:
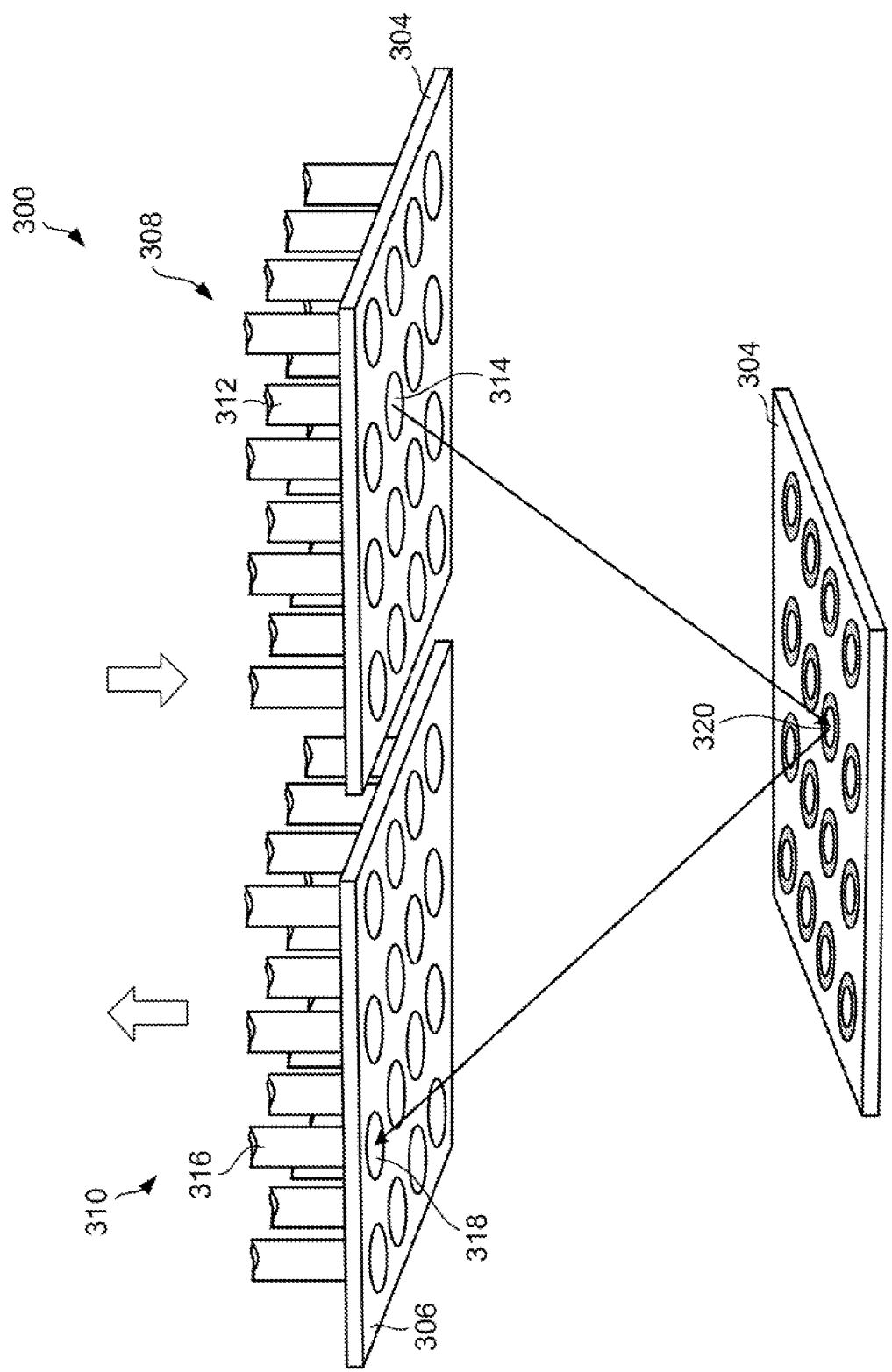
FIG. 3 shows an exemplary circuit switch configured in accordance with embodiments of the present invention.

FIG. 3 shows an exemplary circuit switch 300 configured in accordance with embodiments of the present invention. The circuit switch 300 includes a micro-electromechanical system ("MEMS") mirror farm 302, a first lens array 304, and a second lens array 306. Sixteen waveguides, also called cores, of an incoming 16-core fiber 308 and 16 cores of an outgoing 16-core fiber 310 are each capped by an associated lens in the lens arrays 304 and 306. For example, incoming core fiber 312 is capped by a lens 314 in the lens array 304, and outgoing core fiber 316 is capped by a lens 318 in the lens array 306. The MEMS mirror farm 302 is composed of an array of 16 individual, mechanically controlled silicon micromirrors. The lenses in the lens array 304 can each be oriented to direct light onto a particular micromirror. The lenses in the lens array 306 can be configured to collect light reflected from the micromirrors in the mirror farm 302 into a corresponding outgoing fiber. The circuit switch 300 can be used as a circuit switch by orienting the micromirrors to direct optical signals input on particular incoming cores into particular outgoing cores. The incoming cores can be directly connected to a first computing device such as a packet switch or computer, or to another circuit switch within a switch network, and the outgoing cores can be directly connected to a second computing device such as a packet switch or computer, or another circuit switch within the switch network. For example, consider an optical signal originated from a circuit switch on a network connected to the circuit switch 300 via core 312. The optical signal entering on the core 312 is directed by the lens 314 onto the micromirror 320. The micromirror 320 was pre-oriented to reflect the optical signal to the lens 318, which directs the light out of the switch 300 along the core 316. The core 316 can lead directly to another circuit switch on the network or to a computational device. The micromirrors can be reoriented to break old connections and make new ones in order to implement a variety of different switch topologies on the same physical network. Micromirror switches are not limited to the square 4×4 mirror farm 302. In other embodiments, micromirror switches can be used with any number of rows and columns of micromirrors and lens arrays to provide switching for any number of incoming and outgoing multi-core optical fibers.

Figure 4A:
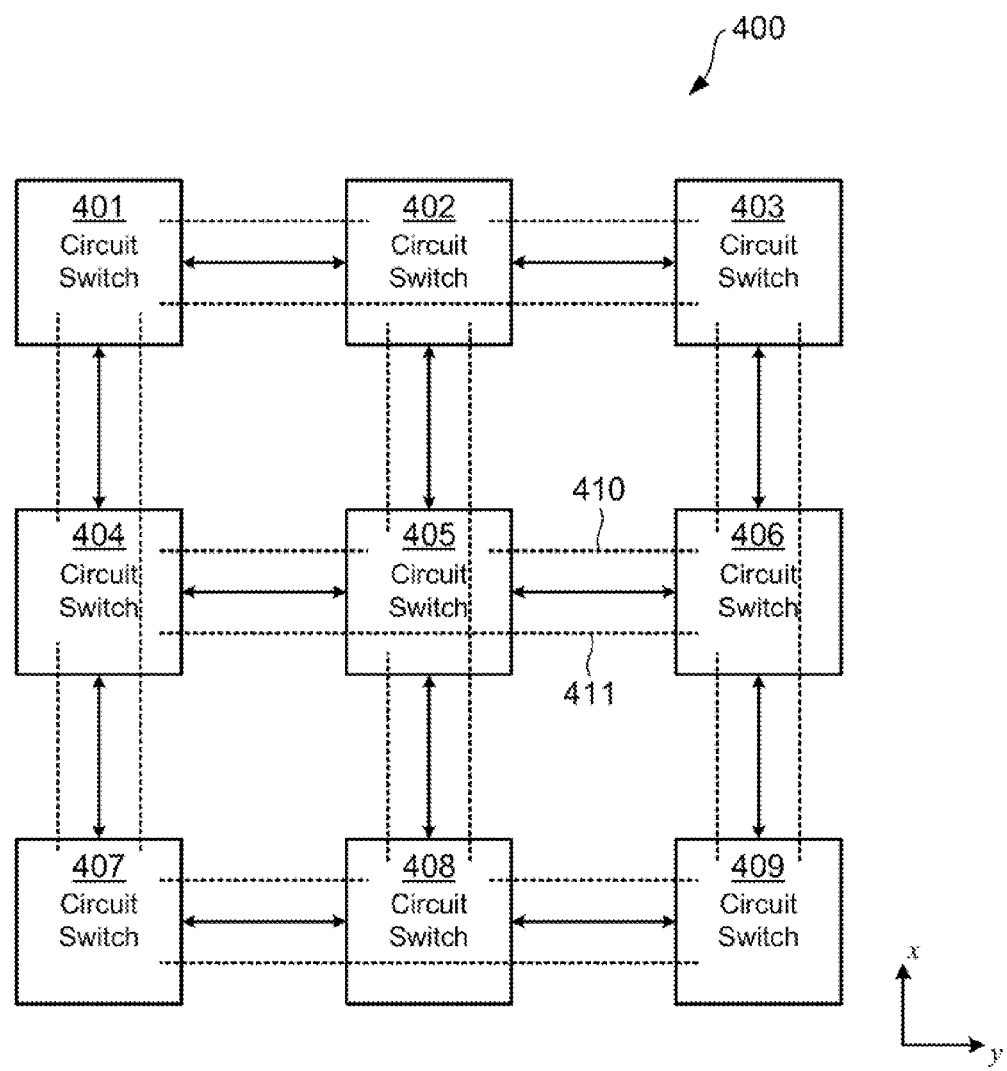
FIG. 4A shows a circuit switch network composed of nine circuit switches.

FIG. 4A shows a circuit switch network 400 composed of nine circuit switches 401-409. Directional arrows represent the physical instantiation of the optical links. Dashed lines represent the logical, direct circuit routes between circuit switches. The circuit switches 401-409 can be mirror-farmed based switches such as those described in FIG. 3. The circuit switches are configured so that each circuit switch can transmit directly to another circuit switch in the x and y directions. In other words, the circuit switches 401-409 are configured so that optical signals logically travel in the directions identified by the dashed lines, but physically travel on the optical links represented by the directional arrows. For example, circuit switch 406 can transmit optical signals directly to circuit switch 405 as indicated by dashed line 410, and circuit switch 405 is also configured so that circuit switch 406 can transmit directly to circuit switch 404, as indicated by dashed line 411.

Figure 4B:
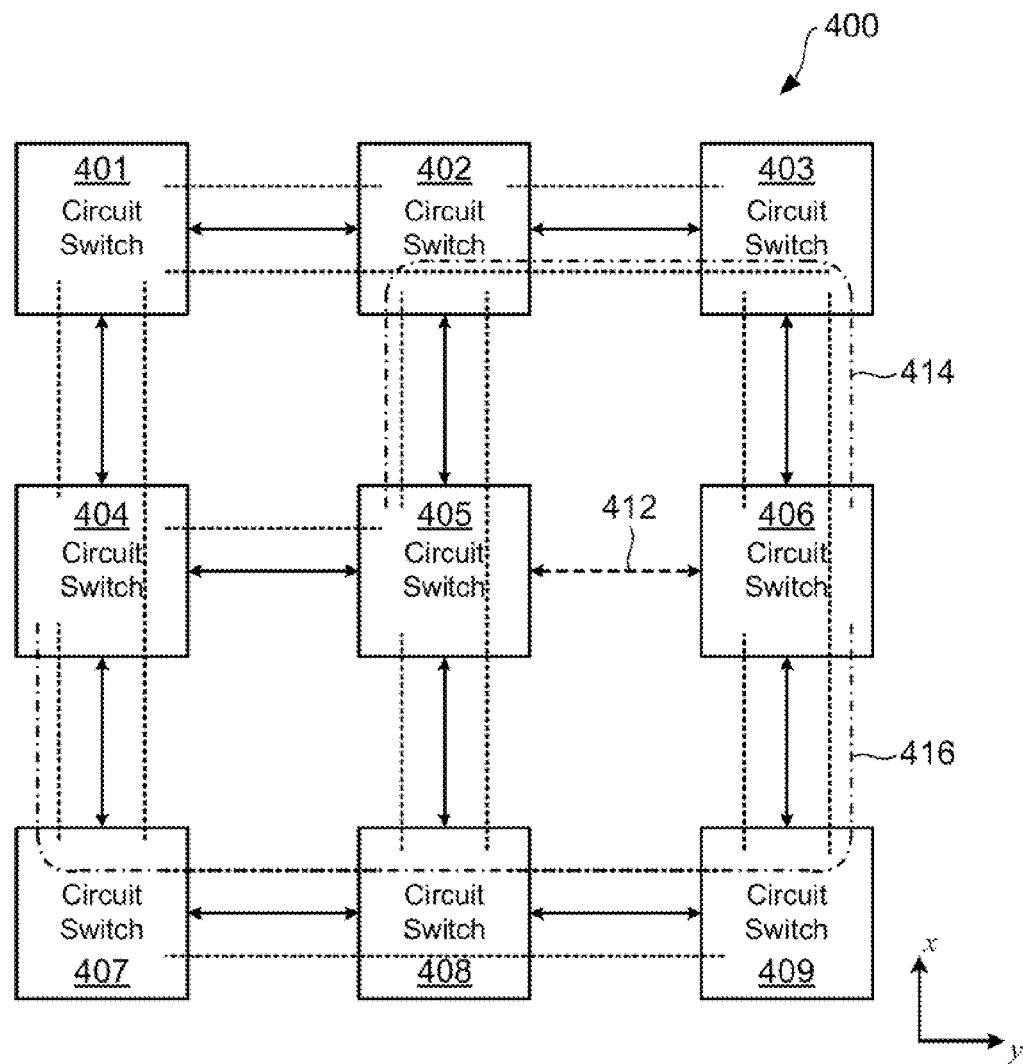
FIG. 4B shows a circuit switched network configured to maintain connectivity when an optical link fails.

Circuit switch networks can be configured to create a variety of possible circuit routes and, as described above, can be reconfigured to direct signals around optical links that fail or to meet the changing demands of traffic. FIG. 4B shows how the circuit switched network 400 can be reconfigured to maintain full connectivity when an optical link fails. In the example of FIG. 4B, dashed-line directional arrow 412 represents a failed optical link. As a result, the logical paths represented by dashed lines 410 and 411, in FIG. 4A, no longer exist. Using excess capacity on the existing optical links and reconfiguring circuit switches 402-409, circuit switch 406 can send optical signals to circuit switch 405 via the logical path represented by dot-dash line 414, and the circuit switch 406 can send optical signals to the circuit switch 404 via the logical path represented by dot-dash line 416. By building this new circuit the logical topology is maintained and the packet routing protocol can proceed oblivious to the failure of the physical link 412. When there is no excess capacity then the remaining capacity can be repartitioned to maintain full connectivity with the original hop count properties but where the bandwidth of each route gets reduced since its share of the capacity has been reduced due to the failed link capacity loss.

A passive network, on the other hand, is one in which the input waveguides are physically connected to output waveguides. Once configured the topology of the passive network does not change. Benefits of a passive network include that the implementation is less costly than a circuit switch and there is no latency penalty associated with reconfiguration since the topology is fixed. A disadvantage is that the topology is inflexible and cannot dynamically adapt to new traffic requirements or component failures on the network.

Figure 5:
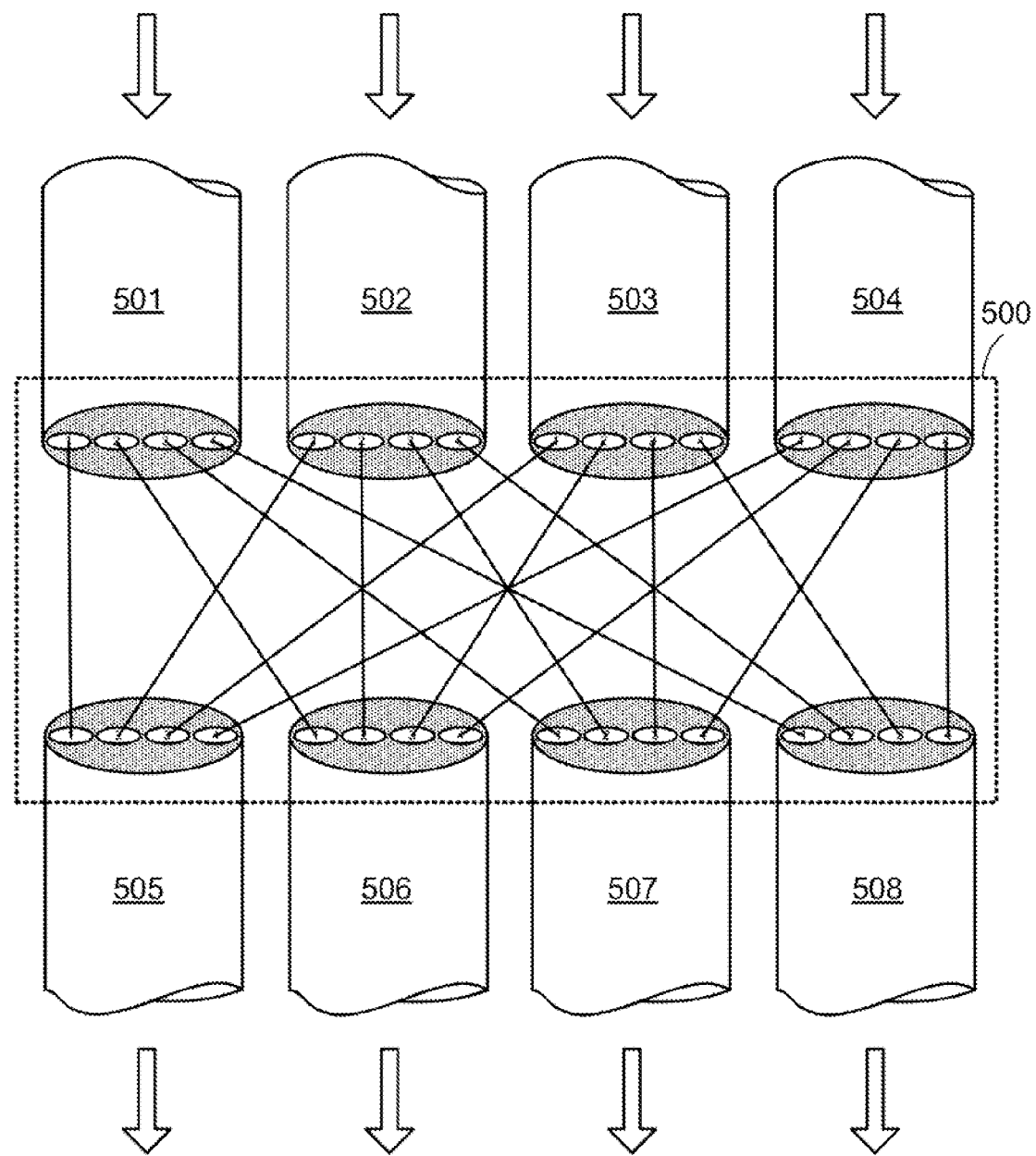
FIG. 5 shows an example of a passive network.

FIG. 5 shows an example of a passive network 500. Optical signals are received on 4-core optical fibers 501-504, and optical signals are output on 4-core optical fibers 505-508. As shown in the example of FIG. 5, the shuffle network 500 is configured by connecting each core of the 4-core optical fibers 501-504 to one particular core in each of the four 4-core optical fibers 505-508. FIG. 5 reveals one particular embodiment for making such connections. The cores of each optical fiber are all labeled 1 through 4. Lines connecting cores in the optical fibers 501-504 to cores in the optical fibers 505-508 can represent optical fibers. The cores of the optical fiber 501 are all optically connected to the cores labeled "1" in the optical fibers 505-508. The cores of the optical fiber 402 are all connected to the cores labeled "2" in the optical fibers 505-508. The cores of the optical fiber 503 are all connected to the cores labeled "3" in the optical fibers 505-508. The cores of the optical fiber 504 are all connected to the cores labeled "4" in the optical fibers 505-508.

II. Hybrid Packet/Circuit Switches

One purpose of an interconnection network is to connect computational endpoints which are sources and destinations for the network's message traffic. As described above, networks can be inflexible when configured with passive networks or costly when configured with only circuit switch devices. In addition, information is typically transmitted over a network in packets. Packet switching involves breaking a message up into a number of packets. Each packet includes a header that is examined at each switch along the path to decide which switch output the packet should be sent on in order to route the packet to the appropriate switch. The packet header can be modified as part of the routing process and not all packets composing a given message have to take the same route from a source switch to a destination switch. The most common form of packet switched networks is to connect a set of packet switch devices with links in a desired network topology. When packets arrive at a switch, the packet switch examines the packet header to determine the destination address and then determines onto which waveguide of an output optical link to place the packet. Packet switches also contain a variety of buffers to improve overall performance and also contain other storage resources as well as compute resources. In general, a packet switch is just a specialized computing device.

System embodiments of the present invention are directed to implementing a packet switched network on top of a circuit switched network to create a hybrid interconnection fabric with the advantage of packet switching and the reconfiguration and low latency benefits of circuit switching. These hybrid packet switched/circuit switched networks are implemented with a hybrid combination of packet and circuit switches that are described as follows.

Figure 6A:
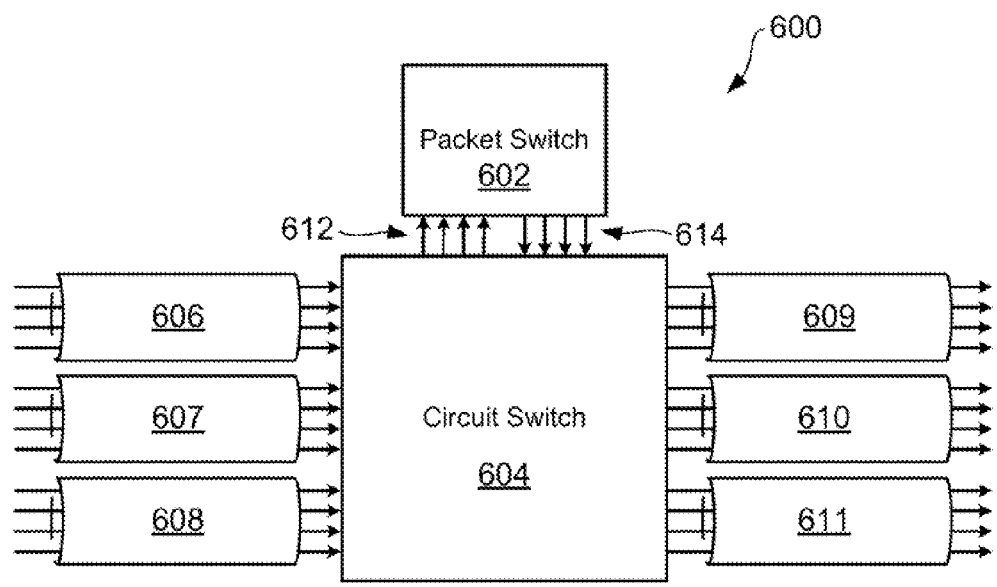
FIGS. 6A-6C shows three hybrid packet/circuit switches configured in accordance with embodiments of the present invention.

FIG. 6A shows a schematic representation of a first hybrid packet/circuit switch 600 configured in accordance with embodiments of the present invention. The hybrid switch 600 includes a packet switch 602 optically coupled to a circuit switch 604, which, in turn, is optically coupled to input and output optical links 606-611, as described above with reference to FIG. 1. As shown in the example of FIG. 6A, input optical signals 612 and output optical signals 614 are transmitted over waveguides between the packet switch 602 and the circuit switch 604. The input optical signals undergo an optical-to-electrical ("OE") conversion at the packet switch 602 so that the information in each packet can be buffered, analyzed, and routed by the packet switch 602 to the appropriate destination. Once routed, the packet switch 602 converts the information into output optical signals using electrical-to-optical ("EO") conversion. The output optical signals are sent to the circuit switch 604 and the appropriate waveguide of the output optical links 604-611.

Figure 6B:
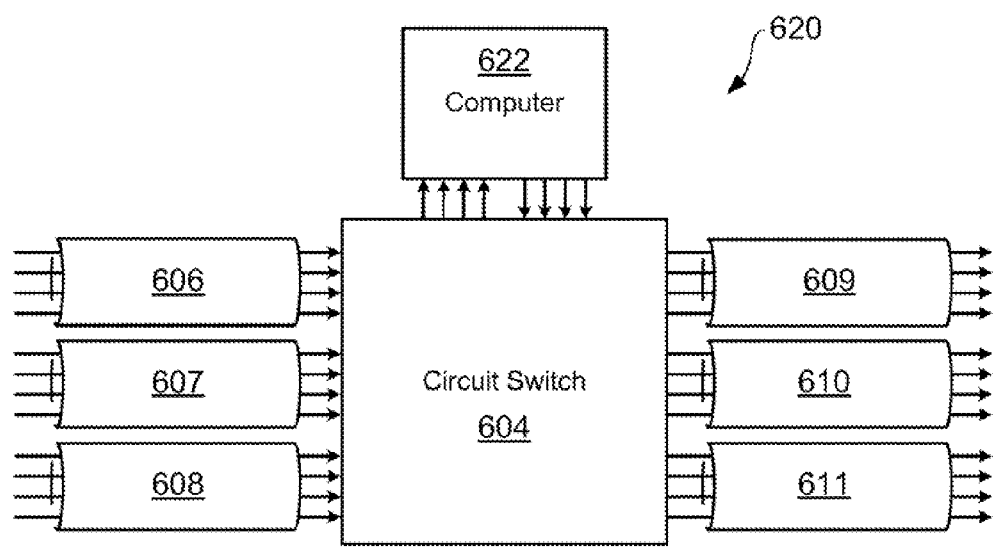

Alternatively, FIG. 6B shows a schematic representation of a second hybrid packet/circuit switch 620 configured in accordance with embodiments of the present invention. The hybrid switch 620 is nearly identical to the hybrid switch 600, but the packet switch is replaced by a computer 622. The computer 622 receives input optical signals from the circuit switch 604 and sends output optical signals to the circuit switch 604. The computer 622 employs OE conversion to convert the input optical signals into electrical signals for processing and employs EO conversion to convert electrical signals generated by the computer 622 into output optical signals that are sent to the circuit switch 604. When the computer 622 sends information it must choose the appropriate output waveguide of the output optical links 609-611.

Figure 6C:
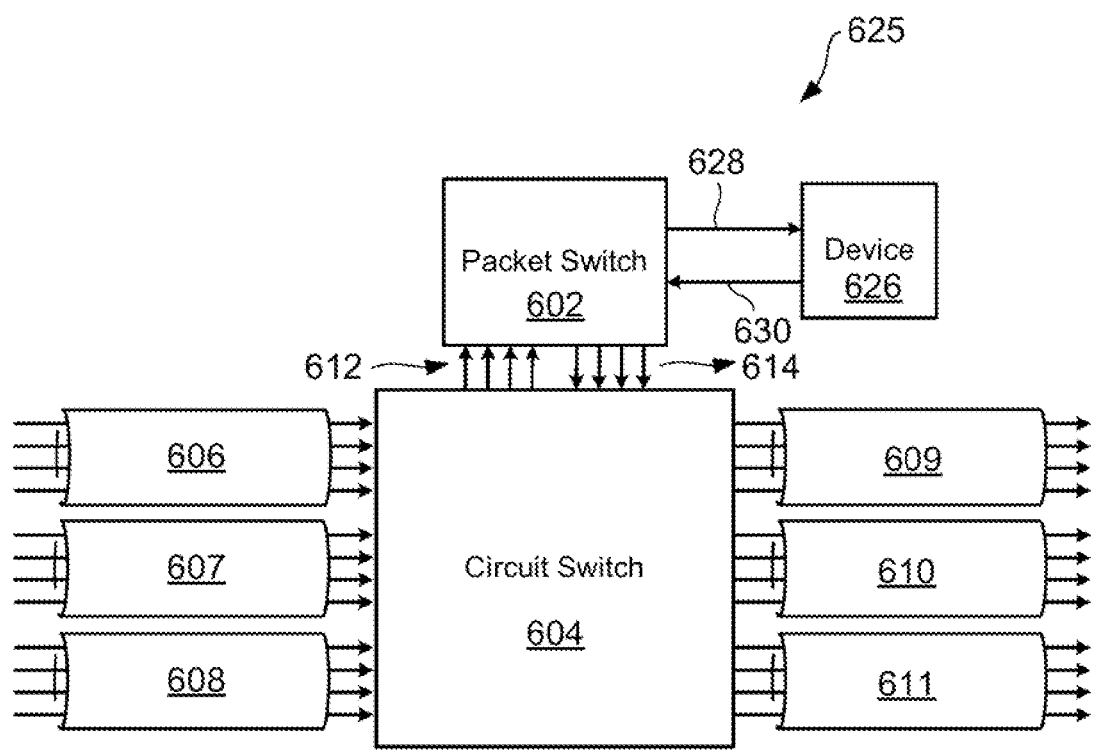

In certain embodiments, an interconnect network can consist of hybrid packet/circuit switches, where a number of the packet switch ports are each connected to a local computing device. The local computing device can be a computer, a processor, memory, sensor, or any other device. FIG. 6C shows the hybrid packet/circuit switch 600 connected to a local computing device 626 in accordance with embodiments of the present invention. In this embodiment, the packet switch 602 is configured to determine whether or not packets are destined for the local computing device 626 or destined for a different switch. When the packets include the address of the local computing device 626, the packet switch delivers the packet over electrical or optical links 628 which connect the packet switch 602 to the local computing device 626. When the local computing device 626 needs to send a packet, the local computing device 626 sends the packet to the packet switch 626 on electrical links 630. The packet switch 602 then examines the destination address in the packet to determine which of the output waveguides 614 is to be used to inject the packet into the circuit switch 604, where the packet can be transmitted over one of the appropriate waveguides of the optical links 609-611 to reach the destination.

III. Implementing Switch Topologies

In the interest of brevity, method embodiments are described below for implementing network topologies on ring and Clos networks having 16 switches. These switch topologies are merely exemplary of the many different kinds of switch topologies that methods of the present invention can be employed to implement and are by no means intended to be exhaustive. Examples of other switch topologies for which methods of the present invention can be employed include cross-bars, X-mesh, hex-mesh, and cubic mesh topologies. Meshes can also have wrap or twisted wrap topologies. Other topologies include chordal rings, a variety of multistage networks, such as folded Clos, Banyan, fat-trees, and various forms of hypercubes, such as k-ary n-cubes, where k and n are integers.

Figure 7:
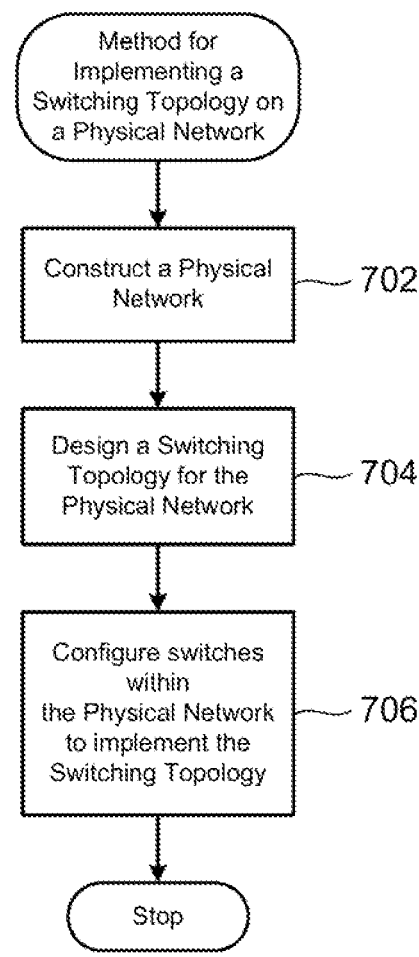
FIG. 7 shows a flowchart representing a number steps in a method for implementing a high-radix switch topology on a low-radix switch physical network in accordance with embodiments of the present invention.

FIG. 7 shows a flowchart representing a number steps in a method for implementing a topology of high-radix switches on a physical network of low-radix switches in accordance with embodiments of the present invention. In step 702, a physical network composed of optical switches interconnected via one or more links is constructed. Each switch can in turn be connected to any number of computing devices, which are sources and/or destinations of information. In step 704, based on the switch and waveguide components comprising the physical switch network, a switch topology is then designed for transmitting information between switches within the physical network. The switch topology provides a plan for configuring the switches to transmit information between switches on the physical network. Typically, the switch topology with the fewest number of hops between switches receiving the most traffic is used to configure the physical network. Examples of switch topologies that can be implemented on various physical networks of the present invention include a ring, a chordal ring, a mesh, a skinny tree, a Clos network, or any other suitable switch topology that can be implemented using the available switches and waveguides of the physical network. In step 706, the switches and waveguides are then configured within the physical network to implement the selected switch topology. In certain embodiments, the optical switches can be configured to implement packet switching, circuit switching, or a combination of packet and circuit switching. In other words, depending on how the information is transmitted, the optical switches can be circuit switches or hybrid packet/circuit switches. For example, if information is transmitted using packets, the physical network can be configured with hybrid packet/circuit switches, otherwise circuit switches can be used. In addition, the physical network can be constructed with switches and waveguides that can be reconfigured to meet changing switch topologies that are selected to meet the needs of changing traffic patterns on the physical network.

A. A Ring-Shaped, Physical Network

Figure 8:
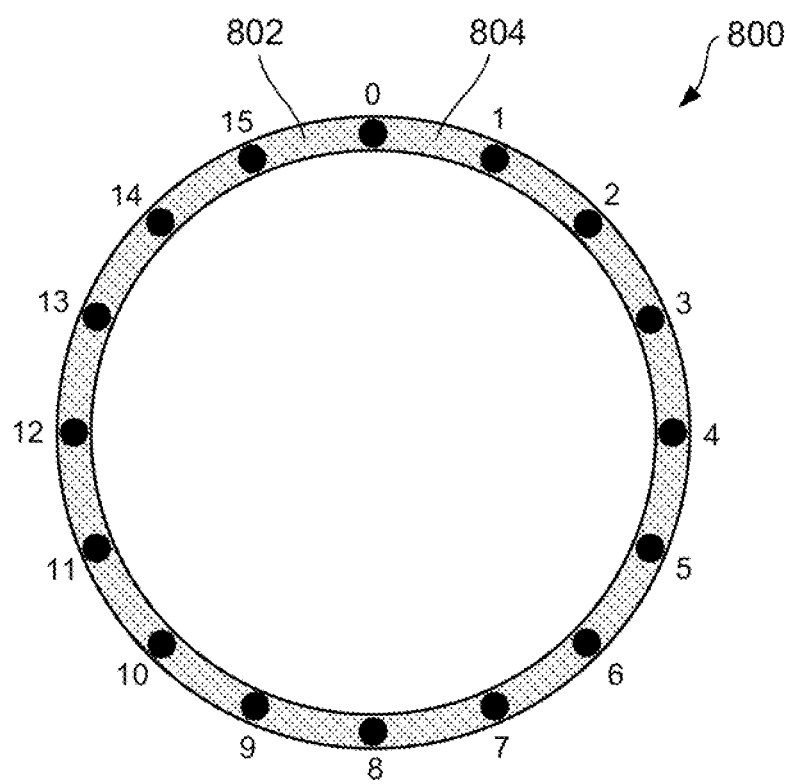
FIG. 8 shows a schematic representation of a ring-shaped, switch physical network 800 configured in accordance with embodiments of the present invention.

FIG. 8 shows a schematic representation of a ring-shaped, physical network 800 configured in accordance with embodiments of the present invention. The physical network 800 includes 16 optical switches connected by links, where each switch is represented by a dot and is identified by a number ranging from 0-15. For example, switch 0 is connected to switches 15 and 1 via links 802 and 804, respectively. Each switch can in turn be connected to a number of different nodes (not shown). If information is sent over the physical network using packets, then the switches 0-15 can be hybrid packet/circuit switches, and the switch network 800 is a packet switched network implemented on a circuit switch network. In other embodiments, when information is not sent in packets, the switches 0-15 can be circuit switches.

Next, a switch topology can be designed to have the fewest number of hop counts given the switch network by employing high radix switches. The kinds of switches selected and the number of available waveguides limits the kinds of switch topologies that can implemented on a particular switch network. Typically, a larger variety of switch topologies can be implemented on physical networks having high radix switches. Physical networks configured with high radix switches can typically be configured with fewer hop counts than physical networks employing relatively lower radix switches. For example, a physical network employing N high radix switches typically has a hop count on the order of $\log_2(N)$. In contrast, an analogous physical network employing N relatively lower radix switches can have a hop count on the order of N.

Figure 9:
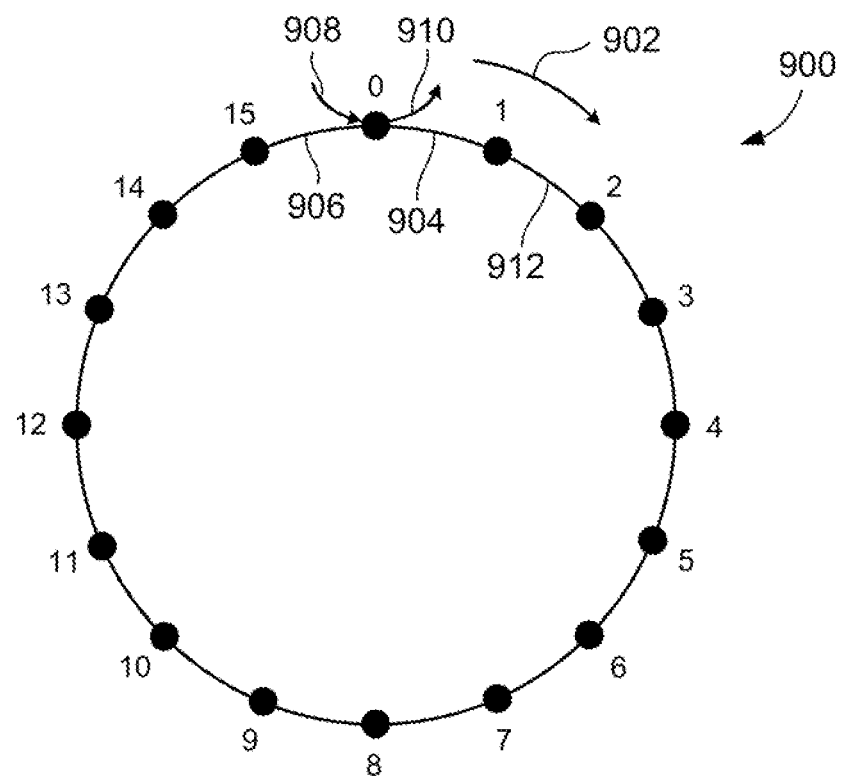
FIG. 9 shows a unidirectional ring switch topology that can be implemented on the network shown in FIG. 8 in accordance, with embodiments of the present invention.

In order to show how selecting the switch topology can be limited by the kinds of switches of the physical network, consider first a simple unidirectional, ring switch topology for the network 800 where the switches in the network 800 are assumed to be radix 2. FIG. 9 shows a simple unidirectional ring switch topology 900 for the switches 0-15 that can be implemented on the physical network 800 in accordance with embodiments of the present invention. In FIG. 9, single waveguides are represented by curved line segments between switches, and information is transmitted in a unidirectional clockwise manner represented by directional arrow 902.

Curved segment 904 represents a single waveguide connecting switches 0 and 1. Switches 0-15 are radix 2 switches including two input ports and two output ports. For example, switch 0 comprises two input ports and two output ports. Switch 0 receives optical signals sent from switch 15 in waveguide 906 at a first input port and receives optical signals generated by a node (not shown) in a second input port represented by directional arrow 908. The node can be a computer, a circuit or packet switch that provides a bridge to another ring. Switch 0 sends optical signals to switch 1 through a first output port in waveguide 904 and removes optical signals that are destined for the node from the physical network 800 by sending these optical signals through a second output to the node, as represented by directional arrow 910.

The switch topology 900 can be implemented on the network 800 with radix 2 switches 0-15 that are connected to other switches via a single core optical fiber or a single core fiber. In order for switch 0 to transmit information to switch 2, the information is first transmitted to switch 1. The information can be carried in packets that include a header identifying the destination switch 2. The switch 1 converts the optical signals into electrical signals that are read by an electronically connected packet switch which directs switch 1 to convert electrical signals encoding the same information into optical signals and transmit the optical signals via waveguide 912 to switch 2. The number of packet switch router hops needed to get the information from the switch 0 to the switch 2 is two. The maximum number of packet switch router hops for the ring switch topology 900 is 15. In general, a ring switch topology implemented on a ring network composed of N radix 2 switches connected via single waveguides has a worst case hop count, also called the "switching diameter," of N−1.

Figure 10A:
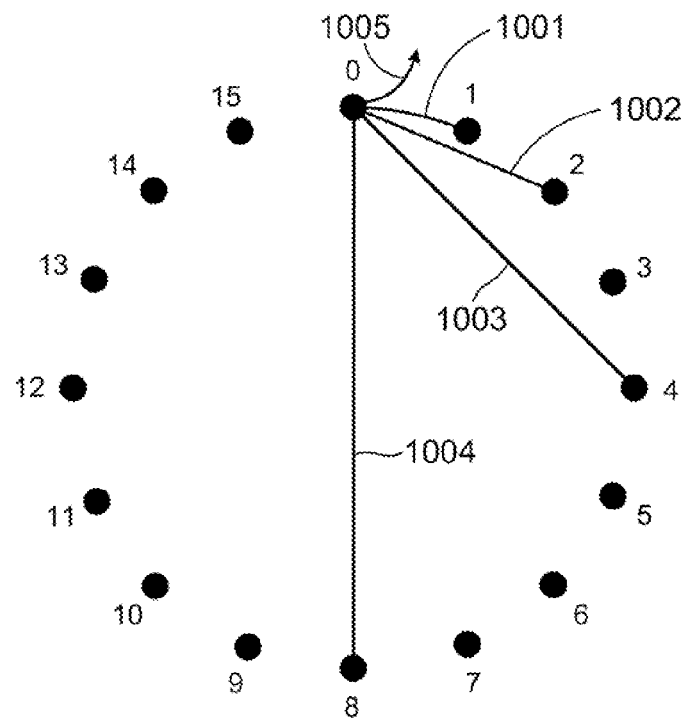
FIG. 10A shows the output directions of optical signals output from a switch 0 of the switch network shown in FIG. 8 in accordance with embodiments of the present invention.
Figure 10B:
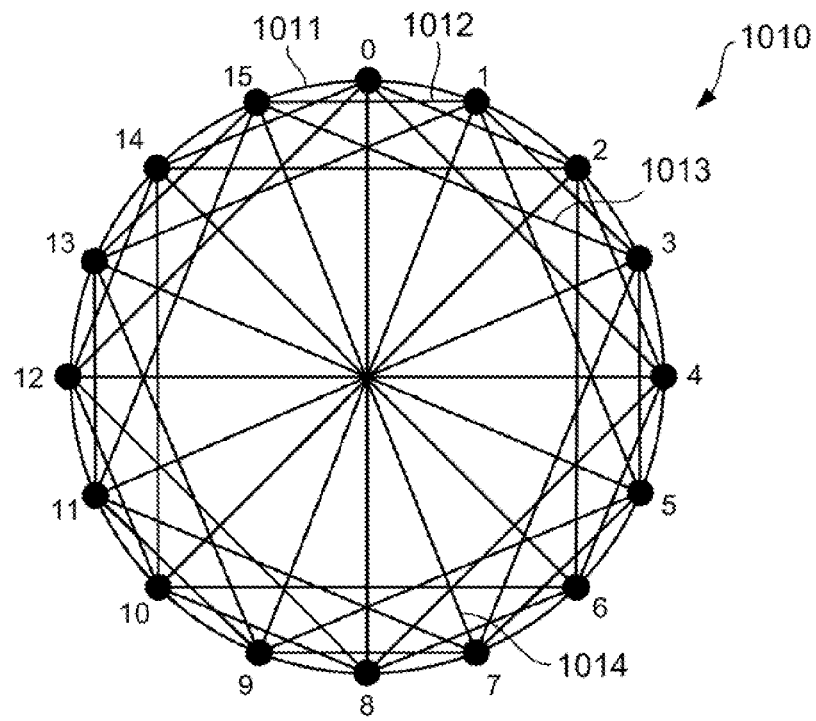
FIG. 10B shows a chordal ring switch topology configured in accordance with embodiments of the present invention.

Consider now a high port count, unidirectional, chordal ring, switch topology that can be implemented on the physical network 800 where the network 800 is implemented with switches 0-15, each of which is a radix 5 switch. FIG. 10A shows the output paths of switch 0 configured to transmit optical signals directly to switches 1, 2, 4, and 8 in a unidirectional manner and a node (not shown) in accordance with embodiments of the present invention. Each separate transmission from the switch 0 to the switches 1, 2, 4, and 8 is accomplished in a single hop on four separate waveguides 1001-1004. The switch 0 extracts optical signals directed to the node as represented by directional arrow 1005. FIG. 10B shows a chordal ring switch topology 1010 configured in accordance with embodiments of the present invention. The chordal ring switch topology 1010 is constructed by repeating the same pattern of input and output waveguides for switch 0, shown in FIG. 10A, at each switch. For the sake of clarity, waveguides leading to nodes connected to each switch are not shown. For example, examination of switch topology 1010 reveals that switch 15 is connected to waveguides 1011-1014 for transmitting optical signals to switches 0, 1, 3, and 7.

Figure 11:
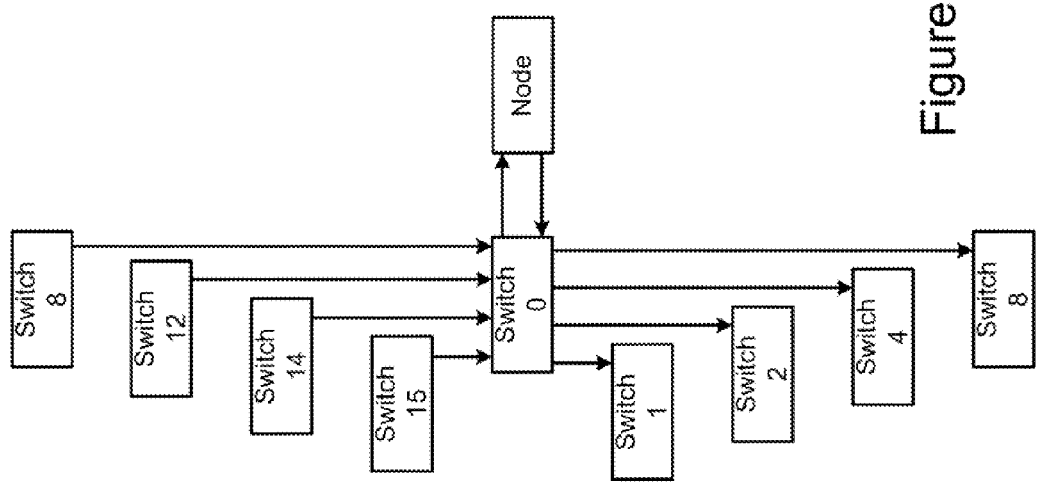
FIG. 11 shows a schematic representation of radix 5 switch of the switch topology shown in FIG. 8B in accordance with embodiments of the present invention.

Each switch in the switch topology 1010 receives optical signals from four different switches in a single hop, extracts the optical signals that are destined for processing at a node connected to the switch, and transmits optical signals to four different switches in a single hop. As a result, each switch has five input and live output ports for a radix of 5. For example, FIG. 11 shows that based on the chordal ring switch topology of FIG. 10B, switch 0 receives optical signals on four separate waveguides from switches 8, 12, 14, and 15, transmits optical signals on four separate waveguides to switches 1, 2, 4, and 8, and transmits and receives optical signals from a node on one input and one output waveguide. Thus, switch 0 has five input and five output ports for a radix of 5.

Figure 12:
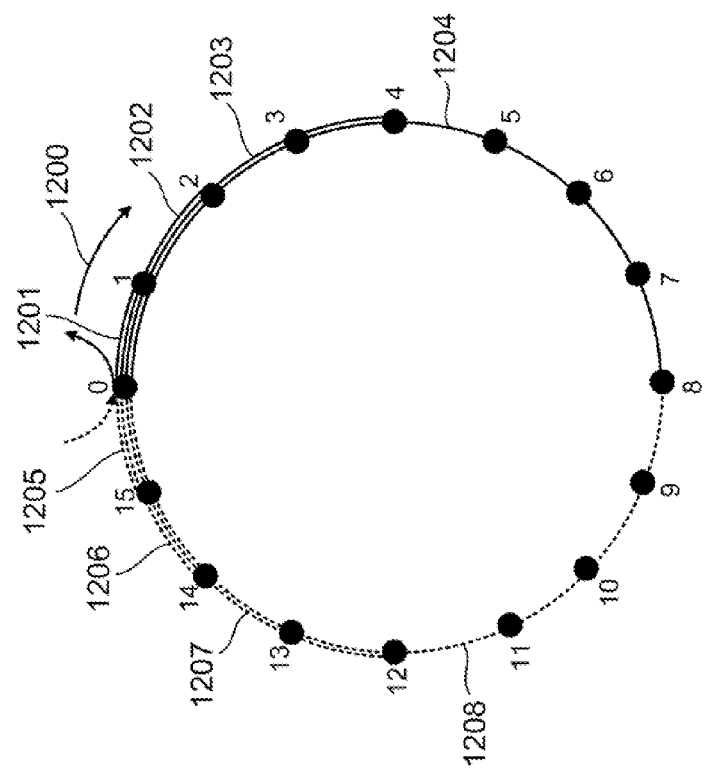
FIG. 12 shows a schematic representation of waveguides of a link that are dedicated to transmitting optical signals to and from a switch in accordance with embodiments of the present invention.

The following description reveals how the high radix switches of the switch topology 1010 can be implemented on a physical network. As a described above, the switches 0-15 of the physical network 800 can be implemented with circuit switches 300 or hybrid packet/circuit switches 600 and 620. Based on the switch topology 1010, it must be determined how each switch can be configured to extract optical signals destined for a node connected to the switch and direct optical signals that are destined for other switches. FIG. 12 shows waveguides of a link that are dedicated to transmitting optical signals to and from switch 0 in accordance with embodiments of the present invention. Directional arrow 1200 represents the direction optical signals travel on the network. Solid curves 1201-1204 represent separate waveguides of the link that are dedicated to direct transmission of optical signals to the switches 1, 2, 4, and 8, and dashed curves 1205-1208 represent separate waveguides of the link that are dedicated to direct transmission of optical signals to switch 0 from the switches 8, 12, 14, and 15. Thus, four waveguides of a link are needed to transmit optical signals to and from each switch. However, this is the case for all 16 switches. Thus, each of the switches 0-15 must also be configured to allow a number of optical signals that are not directed to a node connected to a switch to pass undisturbed.

Figure 13:
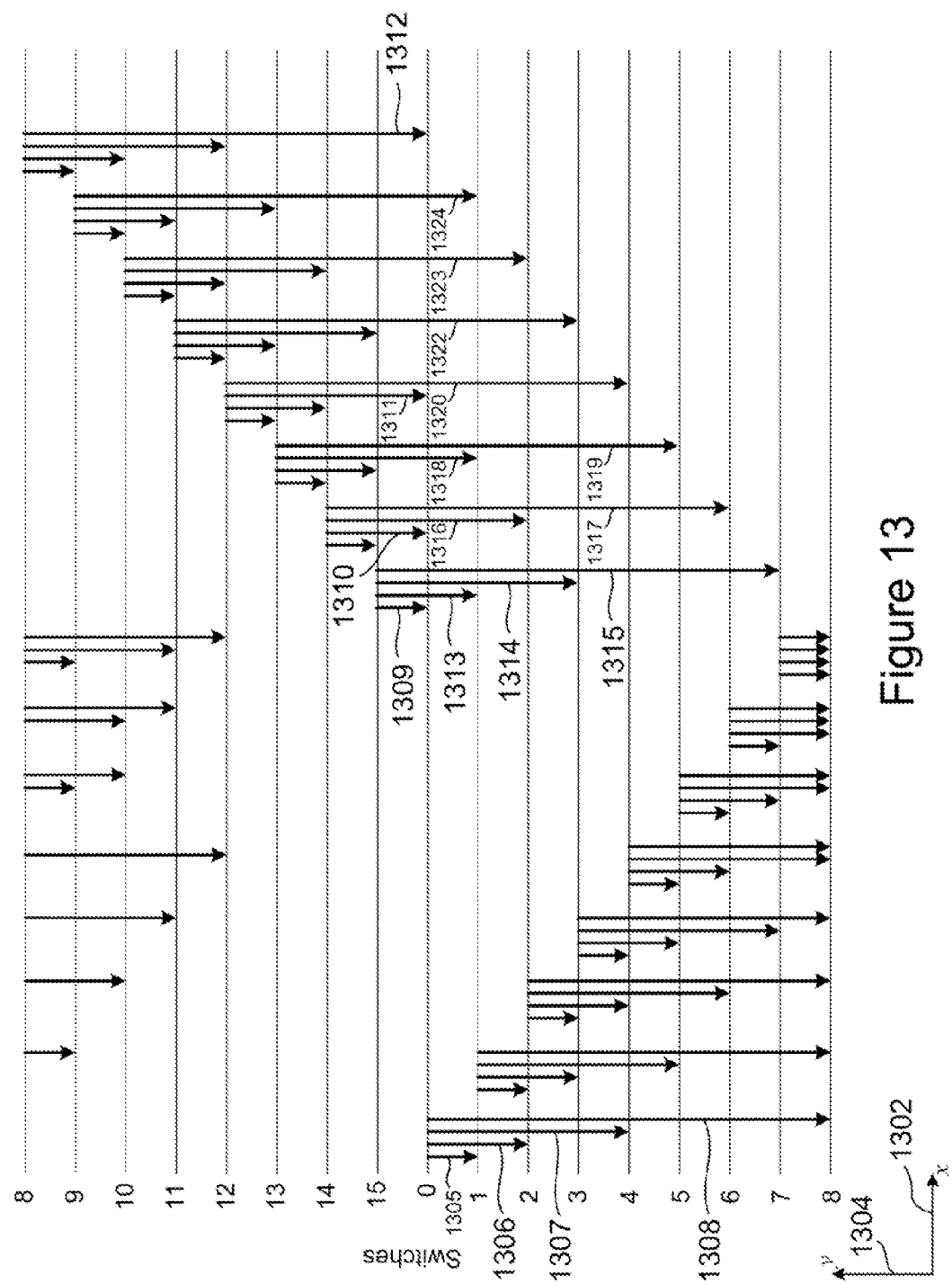
FIG. 13 shows a diagram representing paths optical signals take on the switch topology, shown in FIG. 10B, in accordance with embodiments of the present invention.

The number of optical signals that need to pass through each switch can be determined as follows. FIG. 13 shows a diagram representing the path optical signals take on the switch topology 1010 and can be used to configure each switch of the physical network 800, shown in FIG. 8, in accordance with embodiments of the present invention. In FIG. 13, the 17 parallel lines running parallel to x-axis 1302 represent the 16 switches where the switch 8 has been repeated at the top and bottom. Directional arrows running parallel to y-axis 1304 represent the unidirectional flow of optical signals that start and end at switches revealed by the switch topology 1010. FIG. 13 reveals that each switch needs to be configured so that 11 optical signals pass each switch undisturbed. For example, based on the switch topology 1010, directional arrows 1305-1308 represent optical signals sent from switch 0 to switches 1, 2, 4, and 8, directional arrows 1309-1312 represent optical signals sent from switches 8, 12, 14, and 15 to switch 0, and directional arrows 1313-1324 represent 11 optical signals that pass switch 0 on their way to other switches. These 11 optical signals can be circuit switched through switch 0. The optical signals that terminate or originate at a switch are packet switched. The switches 0-15 can be implemented with two different types of hybrid packet/circuit switches.

In one embodiment, the switches 0-15 are implemented using the hybrid packet/circuit switches 600 or 620, where the circuit switch portion of the hybrid packet/circuit switches can be accomplished using the MEMS mirror farm-based circuit switch 300 as described above with reference to FIG. 6. The switches 0-15 can be configured to receive all of the optical signals transmitted over the links of the physical network 800. In other words, each optical switch has at least a radix of 15 since there are 15 input and 15 output waveguides. The mirrors in the mirror farm of each of the switches can be oriented as described above with reference to FIG. 3 to let optical signals carried by 11 waveguides pass undisturbed. However, the mirrors can be oriented to direct optical signals carried by 4 waveguides to be sent to a node for packet switching.

Figure 14:
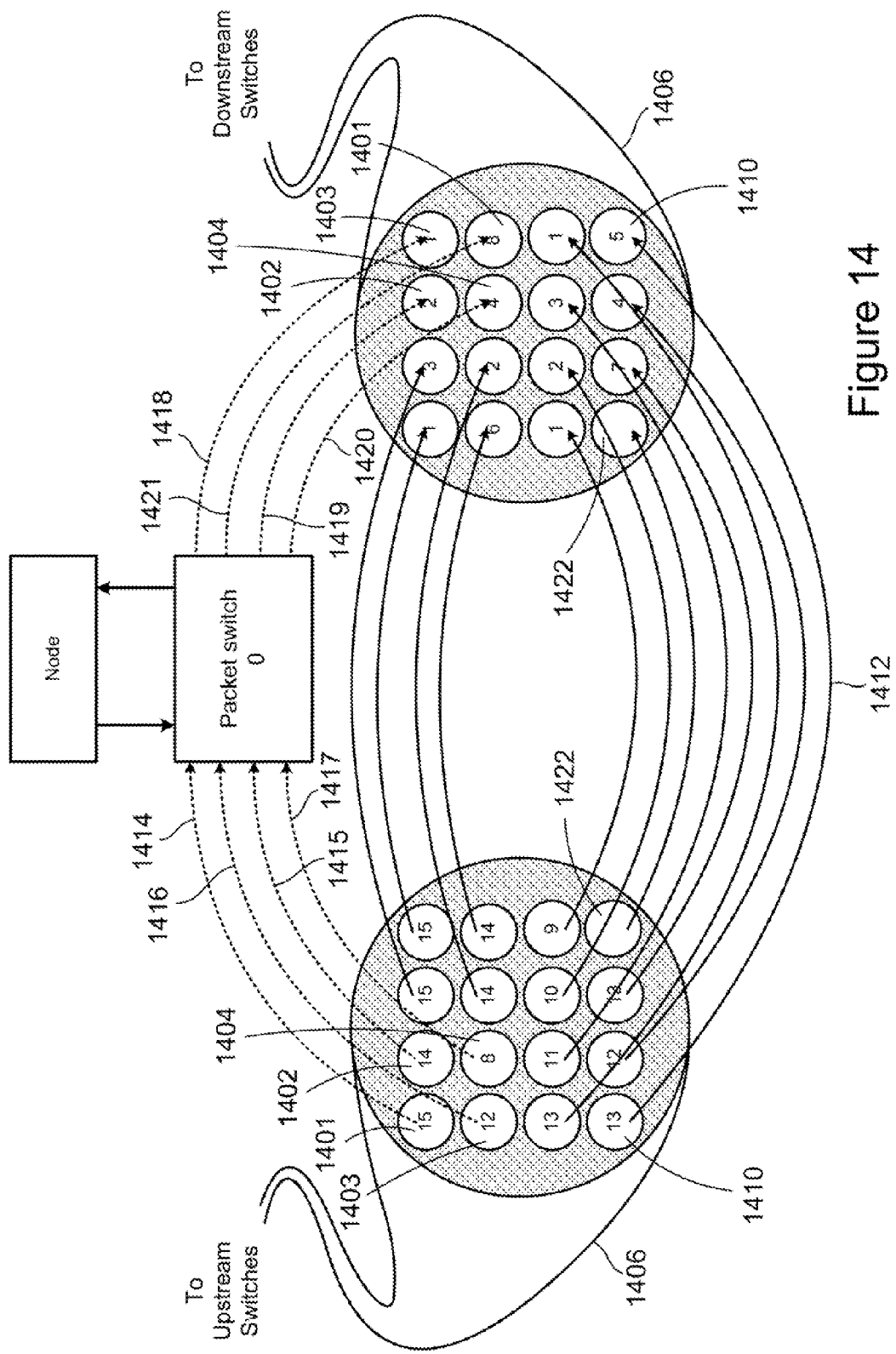
FIG. 14 shows a cross-sectional view and schematic representation of a 16-core fiber configured to route optical signals around a packet switch in accordance with embodiments of the present invention.

In a second embodiment, the switches 0-15 are implemented using hybrid packet/circuit switches comprising packet switches in combination with passively shuffling optical signals carried by 11 waveguides around the packet switch. In other words, each of the switches 0-15 of the physical network 800 is a packet switch that packet switches the optical signals carried by 4 waveguides that terminate at the packet switch leaving optical signals carried by the remaining 11 waveguides undisturbed. FIG. 14 shows a cross-sectional view and schematic representation of a hybrid packet switch/passive shuffle network in accordance with embodiments of the present invention. The passive shuffling is constructed by splicing four cores 1401-1404 from a 16-core fiber 1406 to a switch 0. The numbers in each core represents the number of the switches of the physical network 800 connected at the other end of a continuous unbroken core. For example, core 1410 provides a continuous unbroken connection for transmitting optical signals from the switch 13 to the switch 5. Although all the cores are shown in FIG. 14 as severed at the switch 0, in practice, the cores connected by solid directional arrows are not severed and represent optical signals that pass switch 0, and the dashed-line directional arrows represent spliced cores 1401-1404 that carry optical signals to and from switch 0. The 11 solid directional arrows correspond to the 11 waveguides 1313-1324 that carry optical signals passed switch 0 as described above with reference to FIG. 13. For example, directional arrow 1412 represents the undisturbed transmission of optical signals along the core 1410 connecting the switch 13 to the switch 5, which corresponds to the waveguide 1319, shown in FIG. 13. Dashed-line directional arrows 1414-1417 represent the transmission of optical signals from the switches 15, 14, 12, and 8 to the switch 0, and dashed-line arrows 1418-1421 represent the transmission of optical signals to the switches 1, 2, 4, and 8. The switch 0 is configured as a packet switch in order to extract optical signals transmitted on optical fibers 1401-1404 that are directed to the node 1424 and place optical signal generated by the node 1424 for processing at other nodes into waveguides 1401-1404. Note that the same set of four cores 1401-1404 are used to send optical signals to and from switch 0. The 16 core-fiber 1406 also includes an extra unused core that can be used in the event one of the other cores fails or to provide extra bandwidth. For example, if core 1403 cannot support all of the traffic between switch 0 and switch 1, then core 1422 can be spliced to switch 0 and used to provide additional bandwidth.

B. A Folded Clos Networks

Figure 15:
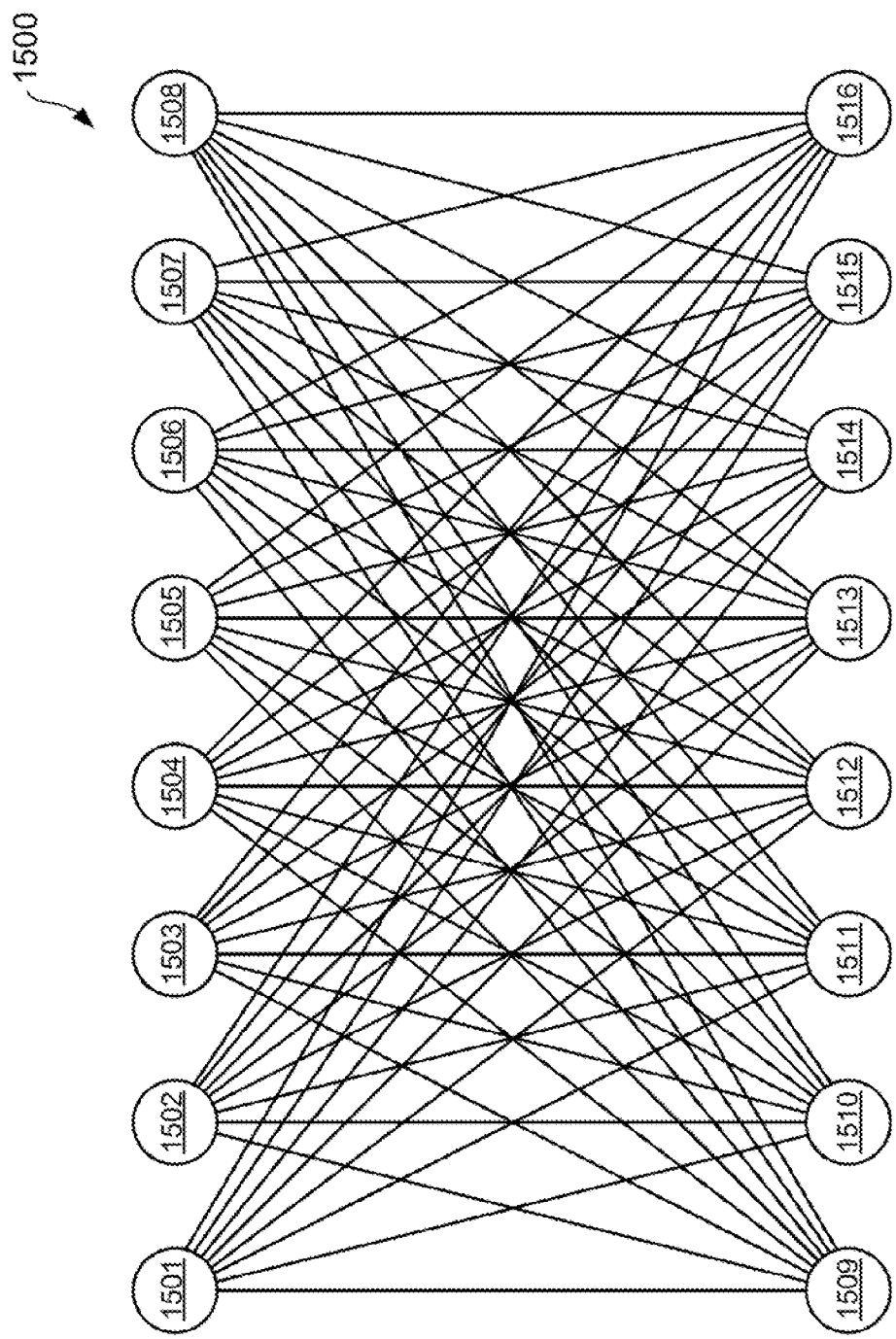
FIG. 15 shows an exemplary switch topology configured in accordance with embodiments of the present invention.
Figure 16:
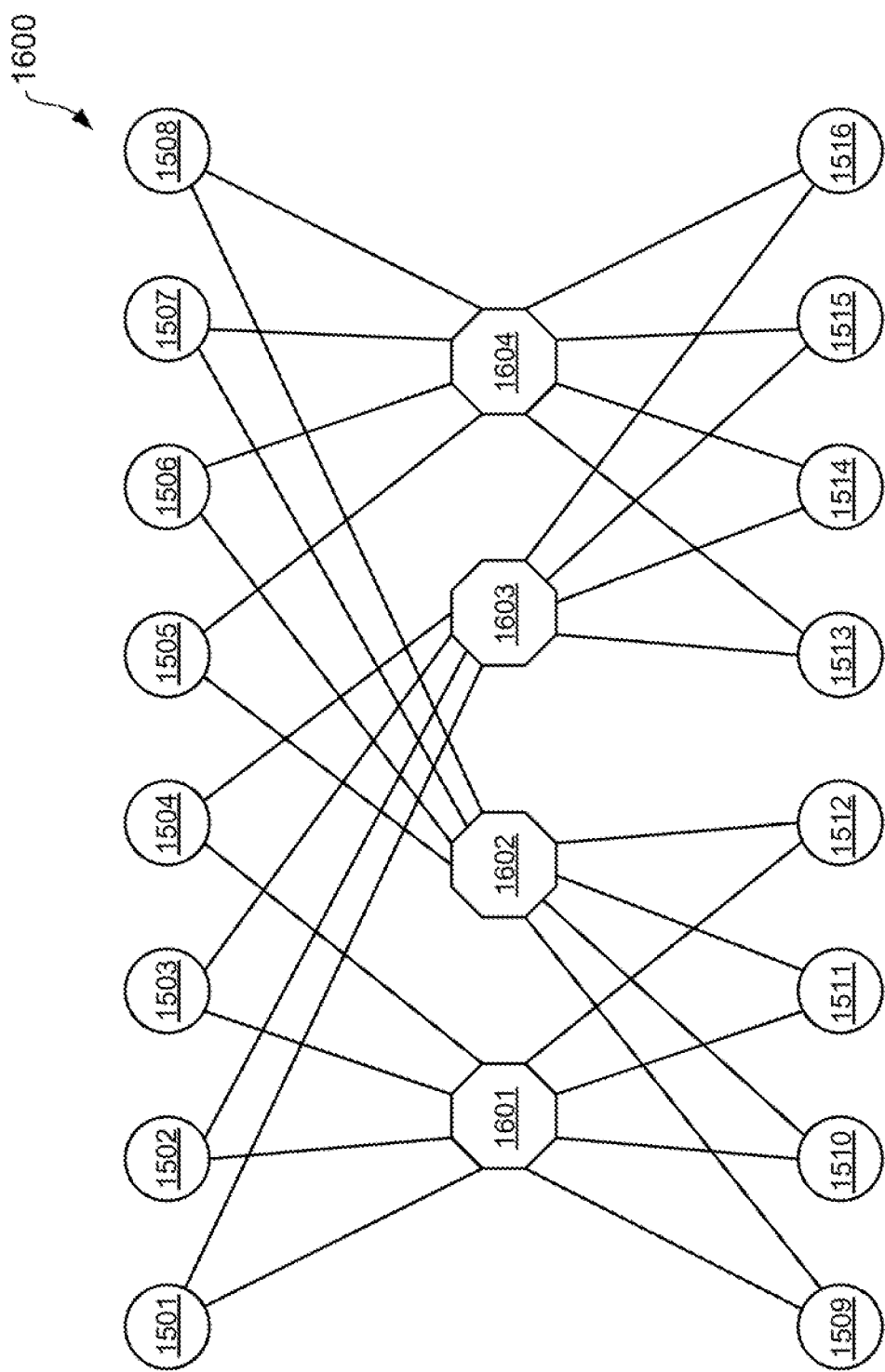
FIG. 16 shows an exemplary physical Clos network configured in accordance with embodiments of the present invention.

In alternate embodiments, a switch network can be composed of rows of switches, where each switch in a given row is configured to transmit information to any switch in an adjacent row. FIG. 15 shows an exemplary high radix switch topology 1500. As shown in the example of FIG. 16 each of the switches 1501-1508 in the first row has eight waveguides that are each connected to a different switch in the second row. Information can be unidirectionally or bidirectionally transmitted between the row of switches 1501-1508 and the row of switches 1509-1516.

These high radix switch topology 1600 can be implemented as a "Clos network." FIG. 16 shows an exemplary folded Clos network 1600 configured in accordance with embodiments of the present invention. The Clos network 1600 is composed of the first row of eight switches 1501-1508 and the second row of eight switches 1509-1516. The Clos network 1600 also includes the four intermediate shuffle networks 1601-1604. The shuffle networks 1601-1604 can be implemented using passive networks, circuit switches, or hybrid packet/switches. Each switch is connected to two different intermediate shuffle networks via a 4-core optical fiber. For example, switch 1508 is connected to the intermediate shuffle network 1602 via a 4-core fiber 1606 and is connected to the shuffle network 1604 via a 4-core fiber 1607. Four-core optical fibers provide the minimum number of cores needed to implement the Clos network 1500 on the physical network 1600. By employing intermediate shuffle networks and 4-core optical fibers, the physical network 1600 has ¼ the number of optical fibers running between switches as is the case with the switch topology 1600 (although the fibers are multicore) Thus, the switch network 1500 provides a lower-radix switch network on which the relatively higher radix switch topology 1500 can be implemented.

Figure 17:
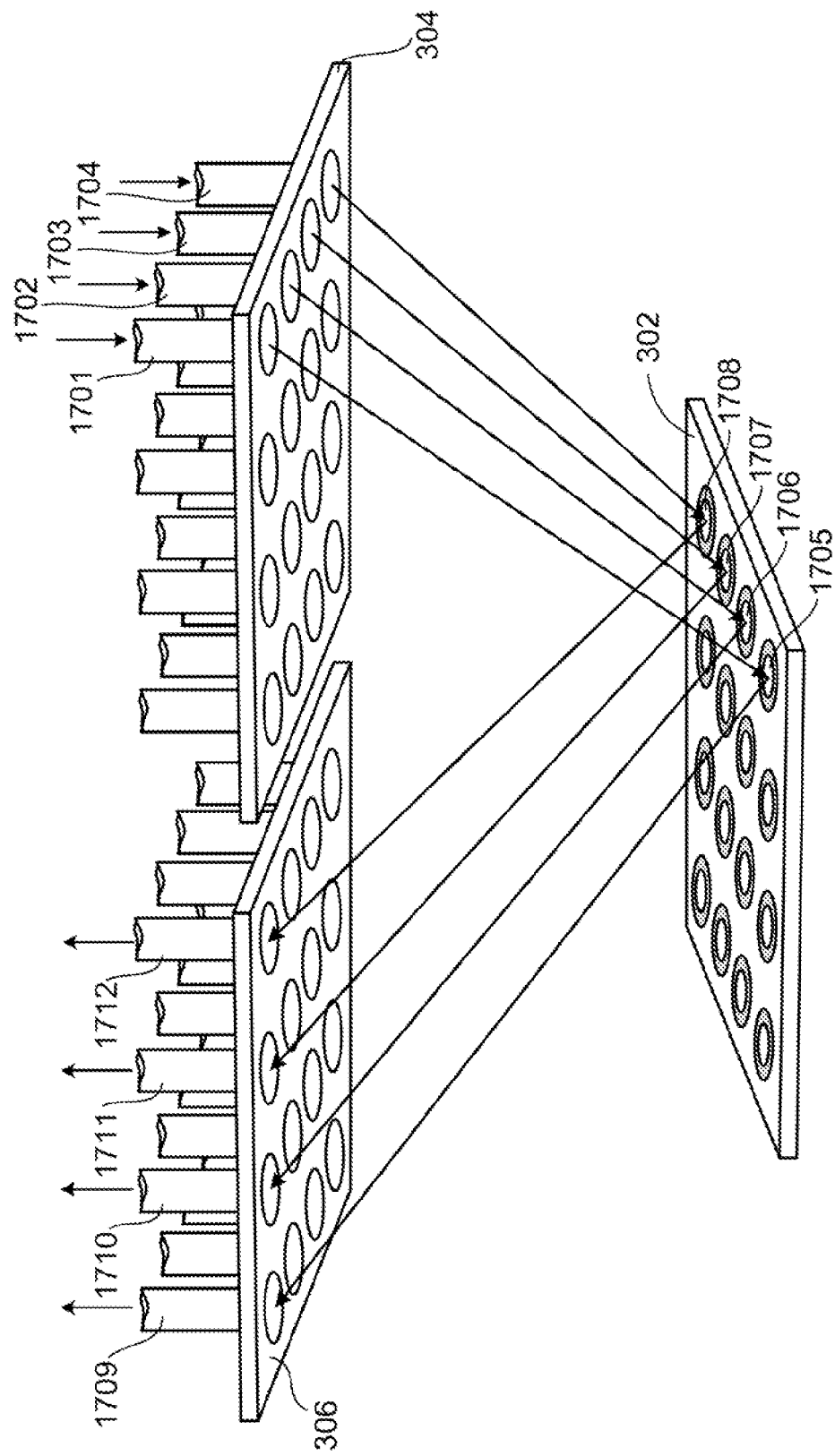
FIG. 17 shows a micromirror switch configured to operate as an intermediate switch in the Clos switch network shown in FIG. 16 in accordance with embodiments of the present invention.

The MEMS switch 300 can be used as the switch in the shuffle networks 1601-1604. For example, in FIG. 17, the cores 1701-1704 can represent the cores of one of the 4-core optical fibers 1601-1604. The micromirrors 1705-1708 of the mirror farm 302 are oriented to direct the optical signals output from the cores 1701-1704 to the cores 1709-1712, where each of the cores 1709-1712 is a core in one of the 4-core optical fibers 1605-1608. The micromirrors of the mirror farm 302 can analogously be oriented to carry out the remaining optical interconnections represented in FIG. 16.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for implementing a higher-radix switch topology on a lower-radix physical switch network, the method comprising:
providing the lower-radix physical switch network comprising hybrid packet/circuit switches connected via links, the hybrid packet/circuit switches including at least one circuit switch and at least one packet switch optically coupled to the at least one circuit switch;
configuring the hybrid packet/circuit switches to implement a first higher-radix switch topology on the physical switch network, wherein configuring the hybrid packet/circuit switches comprises configuring the hybrid packet/circuit switches with a number of hops based on a number of the hybrid packet/circuit switches and a radix of the hybrid packet/circuit switches; and
reconfiguring the hybrid packet/circuit switches to implement a second, different higher-radix switch topology on the physical switch network, the reconfiguring comprising changing circuit routes of the at least one circuit switch, wherein each of the first and second higher-radix switch topologies has a higher radix than the lower-radix physical switch network.

2. The method of claim 1 further comprising configuring the hybrid packet/circuit switches to carry out a hybrid combination of circuit switching and packet switching.

3. The method of claim 1 wherein the hybrid packet/circuit switches further comprise one of more micro-electromechanical system mirror farm-based circuit switches including micro-electromechanical mirrors.

4. The method of claim 1 wherein the links comprise one of:
 a multi-core fiber; and
 a multi-core photonic crystal fiber.

5. The method of claim 1 wherein configuring the hybrid packet/circuit switches comprises splicing cores of multi-core optical fibers to cores of other multi-core optical fibers and switches.

6. The method of claim 1 wherein the configuring comprises orienting mirrors of a micro-electromechanical system micromirror switch, and the reconfiguring comprises reorienting the mirrors of the micro-electromechanical system micromirror switch.

7. The method of claim 1 wherein configuring the hybrid packet/circuit switches comprises configuring each of the hybrid packet/circuit switches to transmit optical signals that are destined for other hybrid packet/circuit switches.

8. The method of claim 1, wherein the at least one packet switch is to receive input signals from the at least one circuit switch, and to send output signals to the at least one circuit switch, the input and output signals corresponding to data communicated for a computing device connected to the at least one packet switch.

9. The method of claim 1, wherein each of the first and second higher-radix switch topologies has a higher numbers of input or output ports than the lower-radix physical switch network.

10. The method of claim 1, wherein the first higher-radix switch topology is selected from among a cross-bar switch topology, X-mesh switch topology, hex-mesh switch topology, cubic mesh switch topology, ring switch topology, and folded Clos switch topology, and the second higher-radix switch topology is a different topology selected from among a cross-bar switch topology, X-mesh switch topology, hex-mesh switch topology, cubic mesh switch topology, ring switch topology, and folded Clos switch topology.

11. The method of claim 1, wherein the number of hops comprises a number of paths traversed from a source to a destination.

12. A method for implementing a higher-radix switch topology on a lower-radix physical switch network, the method comprising:
 providing the lower-radix physical switch network comprising hybrid packet/circuit switches connected via links, the hybrid packet/circuit switches including at least one circuit switch and at least one packet switch optically coupled to the at least one circuit switch;
 configuring the hybrid packet/circuit switches to implement a first higher-radix switch topology on the physical switch network, wherein configuring the hybrid packet/circuit switches comprises configuring the hybrid packet/circuit switches with a hop count on the order of $\log_r(N)$ where N represents a number of the hybrid packet/circuit switches and r is the radix of the hybrid packet/circuit switches; and
 reconfiguring the hybrid packet/circuit switches to implement a second, different higher-radix switch topology on the physical switch network, the reconfiguring comprising changing circuit routes of the at least one circuit switch, wherein each of the first and second higher-radix switch topologies has a higher radix than the lower-radix physical switch network.

13. A system comprising:
 a lower-radix physical switch network comprising hybrid packet/circuit switches connected via links, the hybrid packet/circuit switches including at least one circuit switch and at least one packet switch optically coupled to the at least one circuit switch,
 wherein the hybrid packet/circuit switches are configurable to implement a first higher-radix switch topology on the physical switch network, wherein configuring the hybrid packet/circuit switches comprises configuring the hybrid packet/circuit switches with a hop count based on a number of the hybrid packet/circuit switches and a radix of the hybrid packet/circuit switches, and
 wherein the hybrid packet/circuit switches are reconfigurable to implement a second, different higher-radix switch topology on the physical switch network, the reconfiguring comprising changing circuit routes of the at least one circuit switch, wherein each of the first and second higher-radix switch topologies has a higher radix than the lower-radix physical switch network.

14. A system of claim 13:
 wherein the packet switch is to route packets using addresses in headers of the packets, and
 the packet switch is to convert optical signals received by the circuit switch on input optical links into electrical signals, and to convert electrical signals into optical signals that are sent to the circuit switch for output on output optical links,
 the circuit switch including mirrors configured to be reoriented to change circuit routes of the circuit switch, the mirrors having a first orientation to implement the first higher-radix switch topology, and the mirrors configured to reorient to a second, different orientation to implement the second, higher-radix switch topology.

15. The system of claim 14 wherein each of the input and output optical links comprises one of:
 a multi-core fiber; and
 a photonic crystal fiber.

16. The system of claim 14, wherein the mirrors include reorientable micro-electromechanical mirrors to direct optical signals between optical links.

17. The system of claim 14, wherein the first higher-radix switch topology is selected from among a cross-bar switch topology, X-mesh switch topology, hex-mesh switch topology, cubic mesh switch topology, ring switch topology, and folded Clos switch topology, and the second higher-radix switch topology is a different topology selected from among a cross-bar switch topology, X-mesh switch topology, hex-mesh switch topology, cubic mesh switch topology, ring switch topology, and folded Clos switch topology.

18. The system of claim 13, wherein the hybrid packet/circuit switches are configurable with a hop count on the order of $\log_r(N)$, where N represents a number of the hybrid packet/circuit switches and r is the radix of the hybrid packet/circuit switches.

\* \* \* \* \*